United States Patent [19]

Trulaske, Sr.

[11] Patent Number: 4,890,746
[45] Date of Patent: Jan. 2, 1990

[54] GRAVITY FEED SHELF

[75] Inventor: Robert J. Trulaske, Sr., Frontenac, Mo.

[73] Assignee: True Manufacturing Co., Inc., O'Fallon, Mo.

[21] Appl. No.: 215,571

[22] Filed: Jul. 6, 1988

[51] Int. Cl.⁴ .............................................. A47F 7/00
[52] U.S. Cl. ...................................... 211/59.2; 211/153
[58] Field of Search ..................... 211/59.2, 153, 49.1, 211/126, 134; 108/108

[56] References Cited

U.S. PATENT DOCUMENTS

| | | |
|---|---|---|
| 3,320,011 | 5/1967 | Sachnoff et al. ................. 211/153 X |
| 3,528,558 | 9/1970 | Williams . |
| 3,545,624 | 12/1970 | Krikorian . |
| 3,848,745 | 11/1974 | Smith . |
| 4,128,177 | 12/1978 | Bustos ................................ 211/59.2 |
| 4,136,783 | 1/1979 | Karashima ........................ 211/59.2 |
| 4,238,022 | 12/1980 | Williams ....................... 211/59.2 X |
| 4,294,363 | 10/1981 | Oztekin . |
| 4,346,806 | 8/1982 | Bustos ........................... 211/59.2 X |
| 4,416,380 | 11/1983 | Flum . |
| 4,454,948 | 6/1984 | Spamer .............................. 211/59.2 |
| 4,454,949 | 6/1984 | Flum .................................. 211/59.2 |
| 4,496,037 | 1/1985 | Spamer . |

Primary Examiner—Sarah A. Lechok
Attorney, Agent, or Firm—Cohn, Powell & Hind

[57] ABSTRACT

An improvement to a gravity feed dispenser (D) for container (C) having a guide assembly A. The dispenser includes spaced apart, longitudinally extending rails (34) and the improvement comprises a rectangular shaped overlay (3) of a low friction material. The overlay spans at least two rails and has an integrally formed channel (7) by which the overlay is attached to one of the rails to secure the overlay in place.

7 Claims, 2 Drawing Sheets

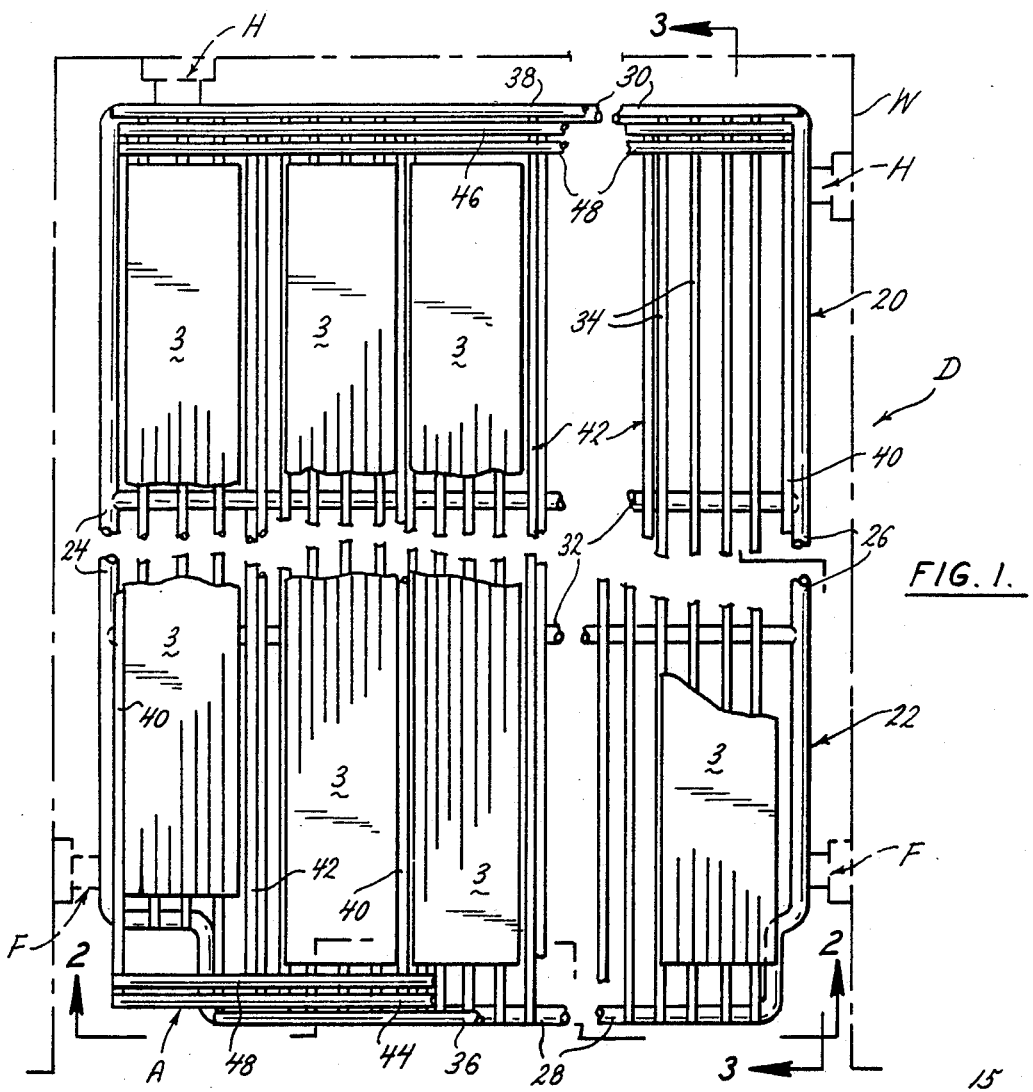
FIG. 1.
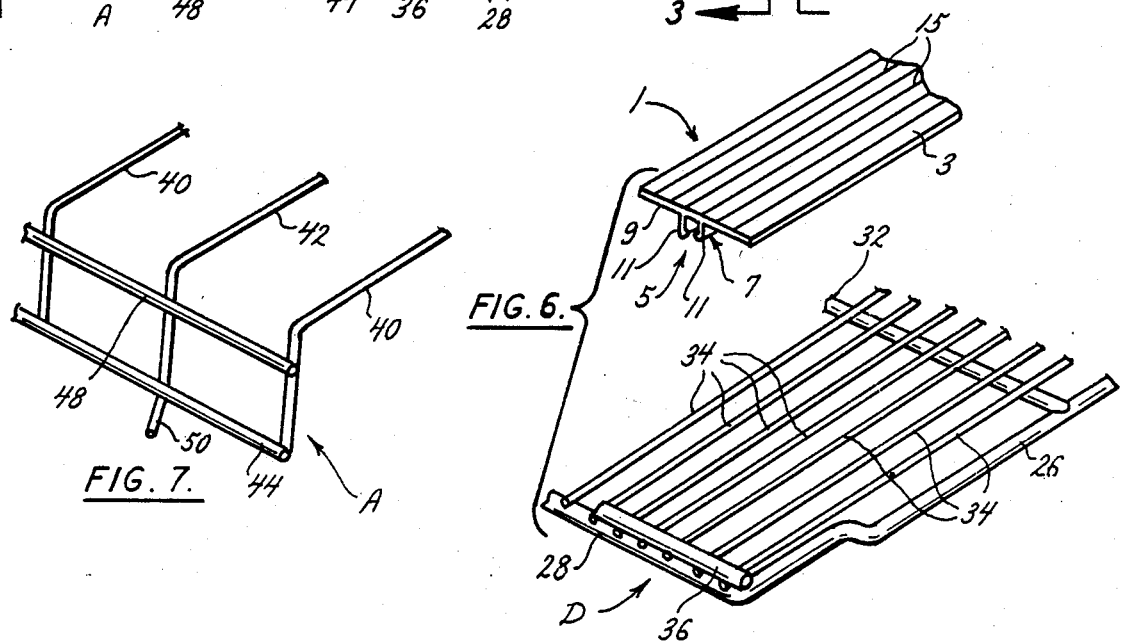
FIG. 6.
FIG. 7.

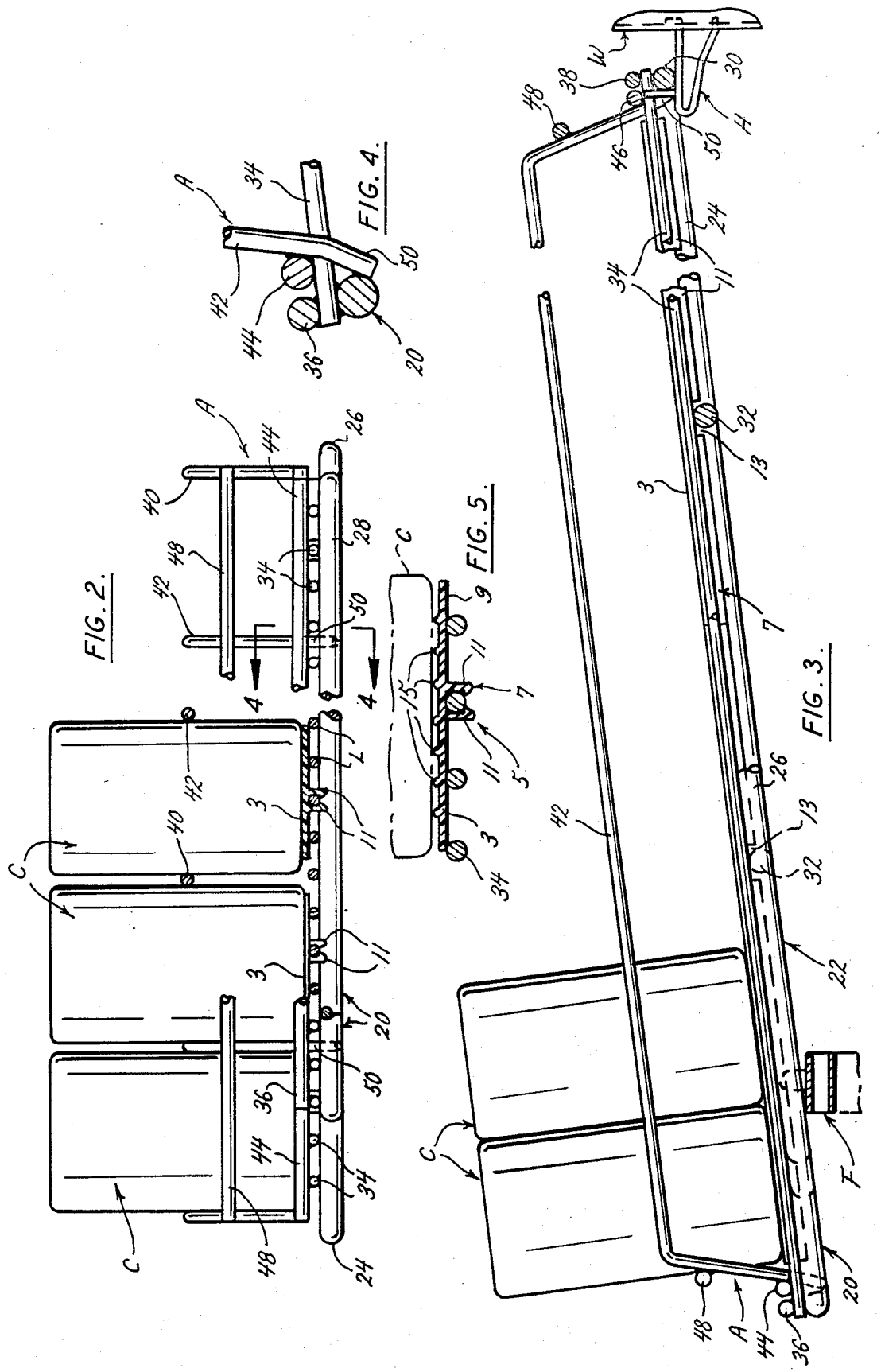

GRAVITY FEED SHELF

BACKGROUND OF THE INVENTION:

This invention relates generally to gravity feed container dispensers for beverages or the like and more particularly, to an improvement for such dispensers.

A recent development in commercial refrigerators of the type used in supermarkets is a gravity feed beverage container dispenser. One dispenser of this type is shown in U.S. Pat. No. 4,294,363. As shown therein, a rack for supporting beverage containers is installed on a display stand or in a refrigerator unit so as to incline from back to front. Spaced apart guide rails are used so that containers placed on the rack are arranged in rows and feed forward, by gravity, when the frontmost container in the row is removed. A guard rail extending across the front of the rack keeps the containers from falling off.

While the above is a useful dispensing apparatus, one problem which may occur results from the friction between the bottom of the container and the rails comprising the rack upon which the containers rest. This friction could cause the container not to feed forward and thus increase customer annoyance in not being able to readily reach a container as well as causing a prolem in the maintenance of the display or dispenser. The friction would typically result from the cold environment within a refrigeration unit as well as the wear which occurs on the rack over time. In addition, racks of the type discussed above are usually intended solely for gravity feed use rather than optional gravity feed or horitzontal use.

The present invention solves these and other problems in a manner not revealed by the known prior art.

SUMMARY OF THE INVENTION:

The present invention provides an improvement to an inclined dispenser or display which reduces friction between the container and the display and thus facilitates the gravity feeding of containers.

It is an aspect of this invention to provide an improvement for a gravity feed dispenser which includes a rack comprising a series of longitudinally extending rails which are parallel to each other and spaced apart a distance less than the diameter of the containers, the rack being adapted for installation so as to slope from rear to front when installed and having at least two guide bars extending longitudinally of the rack and positioned above the rails, the guide bars being spaced apart a distance at least slightly greater than the diameter of the containers so that the containers are formed in rows when placed on the rack, and a stop means extending transversely of the rail across the forward end thereof and positioned above the rails so as to block forward movement of the containers when the forwardmost container in a row is removed and the other containers in the row feed forward, the improvement comprising friction reducing means to facilitate forward feeding of the containers, the friction reducing means including an overlay placeable over a rail and attachment means for securing the overlay to the rack.

It is an aspect of this invention to provide that the overlay is rectangular in shape and removable from the rack.

It is another aspect of this invention to provide that the length of the overlay is substantially the same as that of the rails and the width of the overlay is such that the overlay spans at least two rails when in place.

Yet another aspect of this invention is to provide that the attachment means comprises a channel extending from the underside of the overlay.

Still another aspect of this invention is to provide that the channel is U-shaped and has a width substantially equal to the diameter of a rail.

It is an aspect of this invention that the channel is snap-fitting related to the rails.

Another aspect of this invention is to provide that the rack includes lateral support rails running along the underside of the longitudinally extending rails at spaced intervals and the channel has notches formed in its sidewalls to accomodate the support rails.

Yet another aspect of this invention is to provide that the overlay is made of low friction material such as high impact styrene with coextruded silicone to facilitate sliding movement of containers over the overlay.

It is another aspect of this invention to provide that the overlay and attachment means are integrally formed.

It is an aspect of this invention to provide that the overlay includes a flat plate having longitudinal ribs formed thereon to further reduce friction.

It is a still further aspect of the invention to provide an overlay which is low in cost, and easy to install and maintain. Other objects and features will be in part apparent and in part pointed out hereinafter.

BRIEF DESCRIPTION OF THE DRAWINGS:

FIG. 1 is a top plan view of a rack for holding containers with the improvement of the present invention installed;

FIG. 2 is a sectional view taken along line 2—2 of FIG. 1;

FIG. 3 is a sectional view taken along line 3—3 in FIG. 1;

FIG. 4 is a sectional view taken along line 4—4 in FIG. 2;

FIG. 5 is a cross-section of an overlay comprising part of the improvement as installed;

FIG. 6 is a perspective view of a portion of an overlay illustrating the installation procedure; and FIG. 7 is a fragmentary perspective view of a guide rail and guard rail assembly used with the rack.

Corresponding reference characters indicate corresponding parts throughout the several views of the drawings.

DESCRIPTION OF THE PREFERRED EMBODIMENT:

Referring now by reference numerals to the drawings and first to FIGS. 1-3, it will be understood that a gravity feed container dispenser is generally indicated by D and is intended for use with containers such as cans C. The dispenser D includes a rack 20 formed from a generally rectangular frame 22 having side members 24 and 26, front and rear members 28 and 30 and lateral, intermediate support members 32 extending between the side members of the frame and being in the same plane. The rack 20 also includes a plurality of longitudinally extending rails 34 overlying the frame and support members and attached thereto. The rack is preferrably integrally formed as by welding. The rails 34 are spaced apart laterally a distance substantially less than the diameter of the container C, carried by the rack, and the rack also includes front and rear limit bars 36 and 38 respectively. In the embodiment shown, the rack 20 is supported about its periphery as by front and rear brackets F and H, respectively, supported by the wall W so that, as clearly shown in FIG. 3, it is inclined downwardly from the front to the rear by virtue of the rear supports being at a higher elevation than the front supports.

The dispenser D also includes a guide assembly A which is installed on the rack 20 and includes a plurality of alternately arranged and generally U-shaped guide bars 40 and 42 connected by front and rear bars 44 and 46 and provided with a blocking bar 48 constituting a stop means which extends across the front of the guide assembly A and which restrains the containers from falling off the rack. In order to provide a reversible guide assembly a similar blocking bar 48 is provided at the rear of said assembly. In the embodiment shown the guide bars 42 include front and rear depending portions 50 bent outwardly and spaced apart longitudinally a distance slightly greater than the distance between the front and rear frame members 28 and 30, in a free condition so that the guide assembly is slightly sprung to hold it in position on the rack 20 in the installed condition shown in FIG. 4. The guide rails 40 and 42 are spaced apart a distance at least slightly greater than the diameter of a guided container C so that they do not restrict the gravity feed movement of said containers.

Racks of the type under consideration are generally formed from metal coated with plastic which does not provide the best sliding surface particularly after a long period of service. As a consequence, the containers do not feed forward as they should when the forwardmost container in a row is removed.

The improvement of the present invention comprises a friction reducing means 1 which includes an overlay 3 placeable over one or more of the rails 34. Overlay 3, which is made of an extruded synthetic resin material having low friction characteristics is rectangular in shape. The length of the overlay is substantially the same as that of rails 34 while the width is such that the overlay spans at least two rails when the overlay is in place. As shown in FIG. 1, in the preferred embodiment, the width of overlay 3 is such that it spans three rails; but it will be understood that width could be wider or, within the limits noted above, narrower.

Friction reducing means 1 also includes an attachment means 5 for removably securing the overlay to the rack. Means 5 includes a U-shaped channel 7 integrally formed with the overlay and extending from the underside 9 thereof. The channel has sidewalls 11 which are spaced apart a distance substantially equal to the diameter of a rail and inwardly turned at the ends. This permits a snap fit between the overlay and the rack to securely attach the overlay. Finally, the sidewalls are notched at 13 to accomodate the laterally extending support rails 32. The overlay is thus easily installed or removed from the rack and different width overlays can be installed as different size containers are placed on the rack for dispensing. In the preferred embodiment the overlay 3 includes a plate portion having relatively thin longitudinal ribs 15 which further reduce the friction between the containers C and the overlay. Also the material from which the overlay is extruded is high impact styrene with coextruded silicone which still further reduces friction.

It will be understood that the removable nature of the overlay permits optional use of refrigerator shelving for gravity feed or for use in a conventional horizontal mode in which gravity is not required.

Having described the invention in detail, those skilled in the art will appreciate that modifications may be made without departing from its spirit. Therefore, it is not intended that the scope of the invention be limited to the specific embodiments illustrated and described. Rather, it is intended that the scope of this invention be determined by the appended claims and their equivalents.

I claim as my invention:

1. In a gravity feed container dispenser, the dispenser having a rack on which the containers are placed with the rack comprising a series of longitudinally extending rails which are parallel to each other and spaced apart a distance less than the diameter of the containers, the rack being adapted for installation so as to slope from rear to front when installed and having at least two guide bars extending longitudinally of the rack and positioned above the rails, the guide bars being spaced apart a distance at least slightly greater than the diameter of the containers so the containers are formed in rows when placed on the rack, and a stop means extending transversely of the rail across the forward end thereof and positioned above the rails so as to block forward movement of the containers when the forwardmost container in a row is removed and the other containers in the row feed forward, the improvement comprising friction reducing means to facilitate forward feeding of the containers, the friction reducing means including a removable overlay placeable over a rail and integrally formed attachment means for securing the overlay to the rack, the attachment means comprising a single, non-circular U-shaped channel extending from the underside of the overlay and snap-fitting onto one of the rails and providing the sole means of attachment for the overlay to the rail.

2. The improvement of claim 1 wherein the overlay is rectangular in shape and the length of the overlay is substantially the same as that of the rails and the width of the overlay is such that the overlay spans at lest three rails when in place including at least one rail on each side of said channel.

3. The improvement of claim 1 wherein the channel has substantially parallel sidewalls having a width substantially equal to the diameter of a rail and a rail-receiving portion less than the diameter of a rail.

4. The improvement of claim 3 wherein the rack includes lateral support rails running along the underside of the longitudinally extending rails at spaced intervals and the channel has notches formed in its parallel sidewalls to accomodate the support rails.

5. The improvement of claim 3 wherein the overlay and attachment means are unitarily formed and the channel sidewalls have inwardly projecting rail-receiving portions substantially at the ends of said sidewalls.

6. In a gravity feed container dispenser, the dispenser having a rack on which the containers are placed and removable friction reducing overlays attached thereto to facilitate forward feeding of the containers, the rack comprising a frame having side members, front and rear members and at least one lateral member connected between and in substantially the same plane as said side members and front and rear members, a plurality of longitudinally extending rails disposed above said frame and connected between said front and rear frame members said rails being parallel to each other and spaced apart a distance less than the diameter of the containers, the rack being adapted for installation so as to slope from rear to front when installed and having guide means including a plurality of inverted U-shaped guide bars extending longitudinally of the rack and positioned above the rails, the guide bars being spaced apart a distance at least slightly greater than the diameter of the containers so the containers are formed in rows when placed on the rack, and the guide means including front and rear transversely extending members connecting the guide bars, the front member providing a stop means extending transversely of the rails across the forward end thereof and positioned above the rails so as to block forward movement of the containers when the forwardmost container in a row is removed and the other containers in the row feed forward, and each overlay comprising an upper plate portion with parallel sides having a ribbed upper face and a unitarily formed lower attachment portion in the form of a single channel snap-fitting onto one of the rails and being spaced from each side of the plate portion sufficiently so that the plate portion is supported on at least one rail on each side of the channel to preclude pivoting of the overlay, the channel including parallel sidewalls having a width substantially equal to the diameter of a rail and having inwardly projecting rail-retaining portions spaced apart a distance less than the received rail to provide the snap-fitting relation between the channel and the rail, said sidewalls being notched to accomodate the lateral support rail.

7. A gravity feed dispenser as defined in claim 6 in which the guide means is removable, the guide bars being of a length to be operatively held in sprung relation between the front and rear from members.

* * * * *

UNITED STATES PATENT AND TRADEMARK OFFICE
CERTIFICATE OF CORRECTION

PATENT NO. : 4,890,746

DATED : January 2, 1990

INVENTOR(S) : Robert J. Trulaske, Sr.

It is certified that error appears in the above-identified patent and that said Letters Patent is hereby corrected as shown below:

Abstract, line 2, delete "container" and insert -- containers --

Column 4, line 41, delete "lest" and insert -- least --

Signed and Sealed this

Nineteenth Day of November, 1991

Attest:

HARRY F. MANBECK, JR.

*Attesting Officer*    *Commissioner of Patents and Trademarks*